Patented Jan. 13, 1953

2,625,519

UNITED STATES PATENT OFFICE 2,625,519

OXIDATION CATALYSTS

Martval John Paul Hartig, Glen Ridge, N. J., assignor to E. I. du Pont de Nemours and Company, Wilmington, Del., a corporation of Delaware No Drawing. Application March 7, 1950,
Serial No. 148,270

2 Claims. (Cl. 252—432)

This invention relates to catalysts for the oxidation of organic compounds in vapor phase.

This application is a continuation-in-part of applicant's application Ser. No. 78,670, filed February 26, 1949, now abandoned.

The catalysts of the present invention, as described in applicant's copending application Ser. No. 148,269, filed of even date herewith, which application is a continuation-in-part of applicant's application Ser. No. 78,669, filed February 26, 1949, now abandoned, are unique in their ability to oxidize selectively saturated aliphatic hydrocarbons to maleic anhydride in high yields. The present catalysts, however, are highly useful in oxidizing other types of raw materials such as the olefins, diolefins, aromatic hydrocarbons, alcohols, aldehydes, etc. to oxidation end products. Furthermore, these catalysts have proven useful in various hydrogenation, dehydrogenation, hydroforming, and dehydrosulfurization reactions.

An object of the present invention is to provide new and useful catalysts for the vapor phase oxidation of various organic compounds. Another object is to provide new and useful catalysts for the vapor phase oxidation of various organic compounds which heretofore could not be oxidized to useful end products in any substantial yields. A further object is to provide methods for preparing such catalysts. Other objects will be apparent from the description of the invention given hereinafter.

The above objects are accomplished according to the present invention by providing a catalyst for the oxidation of organic compounds in vapor phase, such catalyst being a precipitated oxide catalyst comprising molybdenum oxide combined with a basic metal oxide from the group consisting of the oxides of cobalt and nickel, the atomic ratio of the basic metal to molybdenum being less than 1:1.

More specifically, the invention resides in a precipitated oxide catalyst comprising molybdenum oxide combined with a basic metal oxide from the group consisting of the oxides of cobalt and nickel, the atomic ratio of the basic metal to molybdenum being less than 1:1, and combined with an acidic promoter from the group consisting of the oxides of boron, phosphorus and vanadium. The atomic ratio of the basic metal to molybdenum is practically limited to at least 0.3:1 due to difficulties in preparation and it is preferred that the ratio be between 1:1 and 0.5:1. In any event, this ratio must be less than 1:1 and greater than 0.1:1 even if a practical means of preparing the catalyst with a ratio of basic metal to molybdenum of less than 0.1:1 were available. Further, the proportion of acidic promoter should be between 0.1% and 15%, calculated as metal and not as the oxide, by total weight of the whole catalyst.

The preferred embodiment of the invention is a precipitated oxide catalyst essentially consisting of molybdenum oxide combined with an oxide of cobalt, the atomic ratio of cobalt to molybdenum being between 1:1 and 0.3:1, and combined with an oxide of boron, the proportion of the latter, calculated as boron, being between 0.1% and 5%, by weight of the catalyst.

The catalysts of the present invention are generally prepared by precipitating molybdenum in the form of a molybdate with a basic metal in the form of a salt from the group consisting of the salts of cobalt and nickel, precipitation being carried out preferably in an aqueous medium, the atomic ratio of the basic metal to molybdenum in the precipitate being less than 1:1, filtering, drying at an elevated temeprature, and thereafter adjusting the physical form of the precipitated catalyst as desired.

In a more specific form the catalysts of the present invention are prepared by precipitating molybdenum in the form of a molybdate with a basic metal in the form of a salt from the group consisting of the salts of cobalt and nickel, precipitation being carried out in an aqueous medium in the presence of an acidic promoter in the form of an acid from the group consisting of the acids of boron, phosphorous, and vanadium, the atomic ratio of the basic metal to molybdenum in the precipitate being less than 1:1, filtering, drying at an elevated temperature, followed by further heating at a more elevated temperature, and thereafter adjusting the particle size of the precipitated catalyst as desired.

In a preferred and still more specific form a particular catalyst of the present invention is prepared by precipitating molybdenum in the form of a molybdate with cobalt in the form of a cobalt salt, precipitation being carried out in an acidic aqueous medium in the presence of boric acid, the ratio of cobalt to molybdenum in the precipitate being less than 1:1, and the boron content of the precipitate being between 0.1% and 5% by weight of the total catalyst, filtering, drying at an elevated temperature followed by further heating at a more elevated temperature, and thereafter adjusting the particle size of the precipitated catalyst as desired.

The following examples will serve to illustrate this invention:

Example I

The following example illustrates the preparation of a precipitated oxide catalyst of molybdenum oxide combined with cobalt oxide.

One and two-tenths moles of molybdenum trioxide were dissolved in two moles of ammonium hydroxide and the solution was diluted to four liters. One mole of cobalt nitrate hexahydrate, $Co(NO_3)_2.6H_2O$, was dissolved in 400 ccs. of water. Each of the solutions was heated to incipient boiling and a purple precipitate (a cobalt molybdate) was formed by the addition of the cobalt nitrate solution to the molybdate solution. This precipitate was filtered, dried and maintained at 450° C. in air for about 4 hours. The resulting compound was the chemically combined oxides of the two metals. The atomic ratio of cobalt to molybdenum was between 1:1 and 0.5:1.

Example II

The following example illustrates the preparation of a precipitated oxide catalyst of molybdenum oxide combined with cobalt oxide and, as a promoter, boron oxide.

One mole of molybdenum trioxide was dissolved in two moles of ammonium hydroxide and the solution was diluted to four liters. 100 grams of boric acid were dissolved in the solution which was then heated to 95° C. One mole of cobalt nitrate hexahydrate was dissolved in 400 ccs. of water and heated to 95° C. The cobalt nitrate solution was poured into the molybdate solution and a purple precipitate was formed. This precipitate was filtered off, dried and maintained at 400° C. in the presence of air for about 4 hours. The resulting compound was the chemically combined oxides of the three metals. The activated catalyst was then ground to the desired size and was ready for use. The atomic ratio of cobalt to molybdenum was 0.9 to 1.

Example III

The following example illustrates the preparation of a precipitated oxide catalyst of molybdenum oxide combined with cobalt oxide and, as a promoter, vanadium oxide.

One mole of molybdenum trioxide was dissolved in two moles of ammonium hydroxide. Fifteen grams of vanadium pentoxide were added to the solution which was diluted to four liters and heated to boiling during which time the vanadium pentoxide dissolved. One mole of cobalt nitrate hexahydrate dissolved in 400 ccs. of water was heated to boiling in another vessel. A purplish brown precipitate (a cobalt vanadomolybdate) was formed by the addition of the cobalt nitrate solution to the hot molybdenum solution. The precipitate was filtered, dried and maintained at 400° C. in the presence of air for about 4 hours. The resulting compound was the chemically combined oxides of the three metals.

Example IV

The following example illustrates the preparation of a precipitated oxide catalyst of molybdenum oxide combined with nickel oxide and, as a promoter, boron oxide.

One mole of molybdenum trioxide was dissolved in two moles of ammonium hydroxide. Eighty grams of boric acid were added to the solution which was diluted to 4 liters and brought to the boiling point. One mole of nickel nitrate hexahydrate, $Ni(NO_3)_2.6H_2O$, dissolved in 500 ccs. of boiling water was added to the molybdate solution to form a green precipitate (a nickel boromolybdate). The precipitate was filtered, dried and maintained at 400° C. in air for about 4 hours. The resulting compound was the chemically combined oxides of the three metals.

Example V

The following example illustrates the preparation of a precipitated oxide catalyst of molybdenum oxide combined with cobalt oxide and, as a promoter, phosphorus oxide.

One mole of molybdenum trioxide was dissolved in two moles of ammonium hydroxide. Fifty grams of phosphoric acid were added, and the solution formed was diluted to four liters with distilled water and brought to the boiling point. One mole of cobalt nitrate hexahydrate was dissolved in 400 ccs. of water and heated to boiling. The cobalt nitrate solution was poured rapidly into the molybdate solution and a purple precipitate (a cobalt phosphomolybdate) was formed. This precipitate was filtered, dried and maintained at 400° C. in the presence of air for about 4 hours. The resulting compound was the chemically combined oxides of the three metals.

In each of Examples III to V the atomic ratio of basic metal to molybdenum was between 1:1 and 0.3:1. In each of Examples II to V the proportion of acidic promoter, calculated as the metal rather than as the oxide, was between 0.1% and 15% by weight of the catalyst.

Example VI

The following example illustrates the preparation of maleic anhydride by the oxidation of butane using the cobalt-molybdenum oxide catalyst prepared in accordance with Example I.

The catalyst in finely-divided form (4–8 mesh) was introduced into a fixed bed type of reactor comprising an aluminum bronze block which was 12 inches long and 4 inches in diameter. A ¾ inch diameter hole was drilled through the block, and a stainless steel tube was fitted therein. An annular reactor was then formed by inserting a smaller diameter stainless steel tube into the larger tube, the smaller tube being centered by means of stainless steel discs at the bottom and in the center of the larger stainless steel tube. The stainless steel disc in the center of the annular reactor tube served as a support for 50 grams of the catalyst. The bronze block was heated by means of cartridge type heaters which were inserted into the block. In this run the ratio of butane to air (volumes of butane to volumes of air) was 2/100 and the block was maintained at about 470° C. The butane and air were premixed and preheated before entering the block, preheating taking place by coiling the inlet tubing around the block before introducing the gas into the annular reaction chamber. The gas was introduced at the top of the annular space containing the catalyst, and the outlet was at the bottom. The space velocity (volume of gas at standard conditions of temperature and pressure per volume of catalyst per hour) of the gas was 720. The maleic anhydride was recovered in a type of carbon adsorption system operated at 100° C. as described in applicant's copending application Ser. No. 755,014, filed June 16, 1947.

The conversion expressed as $$100 \times \frac{\text{moles of butane oxidized}}{\text{moles of butane feed}}$$

was 20%, and the yield expressed as $$100 \times \frac{\text{moles of maleic anhydride produced}}{\text{moles of butane oxidized}}$$

was 48%. The product was pure white in color and did not discolor on aging. It was free from degradation products, and contained no measurable maleic or fumaric acid. It melted at 53.8° C.

*Example VII*

The following example illustrates the preparation of maleic acid by the oxidation of butane using the cobalt-boron-molybdenum oxide catalyst prepared in accordance with Example II.

The catalyst in powdered form (35–100 mesh) was introduced into a fluid bed type of reactor comprising a stainless steel tube 3 feet long and having an inside diameter of 2 inches. The tube was provided with a cone-shaped bottom, and the top of the tube was adapted so that another length of tubing could be added so as to provide for reactors up to six feet in height. The air and butane were metered with rotameters into the bottom of the bed through separate preheaters and into a mixing zone wherein butane/air ratio of 5/100 was formed. The space velocity was 412 hour$^{-1}$. The settled bed height of the powdered catalyst was 2 feet, and the temperature in the reaction chamber was maintained at about 475° C. by the intermittent application of a Bunsen burner flame to the outside of the stainless steel tube.

Maleic acid was formed by conducting the effluent gases into water, thereby dissolving the maleic anhydride therein to form the acid. The amount of maleic acid formed was determined by titration of aliquot samples. Representative samples of the effluent gas were collected and anaylzed by means of Orsat techniques for carbon dioxide, carbon monoxide and oxygen. Yields were in general calculated on oxygen balance. In the above example, the conversion was 46% and the yield was 60%. The maleic acid formed was colorless.

*Example VIII*

The following example illustrates the preparation of maleic anhydride by the oxidation of butane using the cobalt-vanadium-molybdenum oxide catalyst prepared in accordance with Example III.

The catalyst was introduced into the same type of fluid bed reactor as described in Example VII. In this experiment the butane to air ratio was 5/100, the space velocity was 1140 hour$^{-1}$ and the temperature was maintained at about 400° C. The settled bed height of the catalyst was 16.5 inches.

The maleic anhydride in the effluent gases was adsorbed in a fixed carbon bed operating at 100° C. The conversion was calculated at 10% and the yield was 58%. The maleic anhydride recovered melted at 53.9° C.

*Example IX*

The following example illustrates the preparation of maleic anhydride by the oxidation of butane using the nickel-boron-molybdenum oxide catalyst prepared in accordance with Example IV.

The catalyst in powdered form was introduced into a fluid bed type of reactor as described in Example VII. In this experiment the butane to air ratio was 5/100, the space velocity was 1140 hours$^{-1}$ and the temperature was maintained at about 450° C. The settled bed height was 18 inches.

The maleic anhydride in the effluent gases was recovered in a carbon bed. The conversion was calculated at 16% and the yield was 62%.

*Example X*

The following example illustrates the preparation of maleic anhydride by the oxidation of butane using the cobalt-phosphorus-molybdenum oxide catalyst prepared in accordance with Example V.

Ten cubic centimeters of the catalyst in finely-divided form were introduced into the fixed bed type of reactor as described in Example VI. In this example the butane to air ratio was 1/100, the space velocity was 18,500 hour$^{-1}$ and the temperature was maintained at about 500° C.

The maleic anhydride in the effluent gases was recovered in a carbon bed. The conversion was calculated at 1% and the yield was 30%.

*Example XI*

The following example illustrates the preparation of maleic anhydride by the oxidation of butene-2 using the cobalt-boron-molybdenum oxide catalyst and prepared in accordance with Example II.

The catalyst in finely-divided form was introduced into a fixed bed type of reactor as described in Example VI. In this example 10 cubic centimeters of the finely-divided catalyst were inserted into the annular reaction chamber. The block temperature was maintained at about 475° C., the butene-2 to air ratio was 1/100, and the space velocity was 3600 hour$^{-1}$.

The maleic anhydride in the effluent gases was recovered in a carbon bed, the conversion was calculated at 48% and the yield at 37%.

*Example XII*

The following example illustrates the preparation of maleic anhydride by the oxidation of butene-2 using the cobalt-boron-molybdenum oxide catalyst prepared in accordance with Example II.

The catalyst in finely-divided form was introduced into a fixed bed type of reactor as described in Example VI. In this example all conditions were the same as in Example XI except that the block temperature was maintained at about 375° C.

The maleic anhydride in the effluent gases was recovered in a carbon bed, the conversion was calculated at 15% and the yield at 50%.

It will be understood that the above examples are merely illustrative and that the present invention broadly comprises providing a precipitated oxide catalyst for oxidation processes and the like comprising molybdenum oxide combined with a basic metal oxide from the group consisting of the oxides of cobalt and nickel, the atomic ratio of the basic metal to molybdenum being less than 1:1.

The following table illustrates that the atomic ratio of the basic metal to molybdenum must be less than 1:1 to obtain an active catalyst. This table is based upon the vapor phase oxidation of an oxygen-containing gas comprising butane to maleic anhydride under the optimum operating conditions for each particular catalyst containing cobalt and molybdenum in various ratios.

| Catalyst | Atomic Ratio of Cobalt to Molybdenum | Catalytic Activity and Yields [1] |
|---|---|---|
| Oxide Catalyst from: | | |
| Commercially prepared cobalt molybdate on alumina. | 1 | Inactive. |
| Cobalt molybdate from the crystalline hydrate. | 1 | Do. |
| Cobalt boromolybdate precipitated from acid solution. | 0.73 | active—62% yield. |
| Cobalt boromolybdate precipitated from excess ammonium hydroxide solution. | 1.04 | inactive. |
| Cobalt molybdate precipitated from solution containing molybdic acid. | 0.62 | active—48% yield. |
| Cobalt boromolybdate precipitated as in Example II. | 0.90 | active—42% yield. |
| Cobalt boromolybdate precipitated with excess cobalt in slightly basic solution. | 1.59 | inactive. |

[1] Yield is defined as:

$$100 \times \frac{\text{moles of maleic anhydride produced}}{\text{moles of butane oxidized}}$$

It is to be understood that the catalysts of the present invention are not definite chemical compounds but that all of them, upon analysis, are characterized by having the atomic ratio of the basic metal to molybdenum less than 1:1. Molybdenum combined in some manner with oxygen is the essential component of the type of catalyst embodied herein and it is in this sense of the word that the term "molybdenum oxide" is used to designate the form in which molybdenum is present in the subject catalysts. Since the chemistry of molybdenum-oxygen compounds is very complex, much of it is still subject to some debate and speculation. In the instant catalysts molybdenum probably occurs in the anion as a molybdate, an isopolymolybdate, or a heteropolymolybdate together with some other acidic constituent such as boron, phosphorus, or vanadium. In referring to the present catalysts as comprising molybdenum oxide combined with a basic metal oxide from the group consisting of the oxides of cobalt and nickel, the general formula $RO \cdot nMoO_3$ may be used to illustrate that which is meant by the term "oxide" as used herein in which R represents cobalt or nickel. Depending upon the conditions under which the catalyst is prepared, $n$ may vary from a value greater than 1 to 16 inclusive, it being understood that the atomic ratio of basic metal to molybdenum is to be less than 1:1. Furthermore, it is within the scope of this invention to include catalysts in which the value of $n$ is predominantly 2, 3, or 4 etc., or catalysts which may be composed of a mixture of oxides of the general formula $RO \cdot nMoO_3$ in which the value for $n$ varies for each particular oxide.

Regardless of the particular structure of the type of catalysts embodied herein, molybdenum combined in some manner with oxygen is the essential component thereof, the function of the molybdenum being to act as the center of oxidation and to promote attack on the material being oxidized. The latter function is probably the key to the reactions involving the oxidation of saturated aliphatic hydrocarbons.

As briefly discussed hereinbefore, molybdenum alone is not sufficient for the oxidation of the organic compounds, but it is combined in these catalysts with a basic metal oxide from the group consisting of the oxides of cobalt and nickel. The preparation of a satisfactory catalyst may vary widely, but it is necessary that the catalyst be formed in such a manner that the atomic ratio of the basic metal to molybdenum be less than 1:1; broadly, any procedure may be used that will give a precipitated oxide catalyst of the composition hereinbefore set forth. Among the factors that tend to affect the composition of the precipitate and, hence, the combined oxides obtained therefrom, are the chemical nature of the precipitating ions, the pH of the solution, the temperature of the precipitation, the rate of precipitation, the exact method of precipitation, the sequence of addition of precipitating solutions, absolute concentration of the precipitating ions, the relative concentration of the precipitating ions, the filtering and washing techniques, and the methods of drying and heat treatment. These factors may also affect the structure of the combined oxides and, to some degree, even the activity of the catalyst. While precipitation from aqueous medium is ordinarily the most economical and practical, an organic liquid medium may be used. Other methods of preparation, apparent to those versed in the art, can also be employed so long as the catalyst conforms to the specific combination of constituents as set forth.

In following the preferred precipitation procedure illustrated in foregoing Examples I through V, it is instructive to realize the effect on the catalyst of the more important of the aforementioned variables. As mentioned hereinbefore, the pH of the precipitating medium may be varied. Preferably, the precipitating medium will be acidic, that is, below a pH of 7, but satisfactory catalysts have been prepared in slightly basic solutions. For example, a cobalt boromolybdate convertible to a satisfactory catalyst, has been prepared in aqueous mediums ranging from a pH of 6.5 to 8.5. However, it is to be understood that when precipitation is carried out in a medium having a pH greater than 7, other variables, such as absolute concentration of the precipitating ions, the relative concentration of the precipitating ions, and the filtering and washing techniques, must be adjusted to obtain a precipitate having an atomic ratio of basic metal to molybdenum less than 1:1. In general, for example, it has been found that when precipitation is carried out in a solution having a pH greater than 7, that is, slightly basic, a substantial excess of the molybdate ion must be present, the solutions of the precipitating ions must be highly concentrated, and the resulting precipitate cannot be washed but must be dried and heated to an elevated temperature directly. These necessary adjustments in the variables involved in preparing the catalysts of the present invention are pointed out to emphasize that it is preferred that the present catalysts be prepared in an acid medium, that is, a pH less than 7, but that they may be prepared in a slightly basic medium.

In line with the foregoing discussion, it has been substantiated in preparing the present catalysts, that precipitating solutions which are substantially acid are favorable to the formation of complex ions in which the contributing ions are said to cluster or polymerize. For example, in the preparation of a cobalt molybdate in a substantially acid solution, clustering of the molybdate ions is promoted and less cobalt precipitates, thereby leading to the formation of an oxide catalyst in which the ratio of cobalt to molybdenum would be less than in a more nearly neutral solution or slightly basic solution. In general, under various conditions which contribute to making the precipitating medium more acid the molybdate ions tend to cluster and less of the basic metal constituent precipitates.

Where the atomic ratio of basic metal to molybdenum of less than 1:1 is a definite requirement of the catalyst, as it is in the present invention, the precipitation of the molybdate from which the combined oxides are obtained on heating, must apparently be either from an acid solution or, at most, a slightly basic solution, that is, a pH up to about 8.5. While precipitation from an acid solution will always give an atomic ratio of basic metal to molybdenum of less than 1:1 under any reasonable conditions, no set of conditions have been found whereby this necessary atomic ratio can be obtained when precipitation is from an even moderately strong basic solution, that is, a pH above 8.5, although, if the oxides in the requisite ratio could be obtained by precipitating the molybdate from such strong alkaline solution, there is no reason to expect the catalyst would not be active.

Although the foregoing examples illustrate the precipitation of molybdenum in the form of a molybdate with a single basic metal from the group consisting of cobalt and nickel, it is entirely within the scope of this invention to precipitate the molybdenum with a combination of the two basic metals in the form of a mixture of basic metal salts in an aqueous medium or otherwise. Such a modification in the preparation of the subject catalysts can be made so long as the atomic ratio of the basic metal content of the resulting catalyst composition to molybdenum is less than 1:1.

Although satisfactory catalysts can be made from molybdenum oxide plus a basic metal oxide, it is beneficial to incorporate an acidic promoter with these catalyst compositions, the acidic promoter being preferably selected from the group consisting of the oxides of boron, phosphorous, and vanadium. Included among other promoters which may be used are silicon, tungsten, titanium, beryllium, zirconium, chromium, and uranium. These promoters are added to the precipitating medium and, subsequent to heating the catalyst at an elevated temperature, the promoters will be present in the catalyst in the form of oxides. From about 0.1% to 15% of the boron, phosphorus or vanadium, by weight of the total catalysts, should be present in the catalyst. It is to be understood that these promoters act in different ways and, depending upon the particular acidic promoter employed, addition thereof to the catalyst composition may tend to increase the activity of the catalyst, improve the selectivity of the catalyst with respect to the oxidation of particular organic compounds, control the physical structure of the catalyst, or help to control the ratio of basic metal to molybdenum in the process of precipitation of the catalyst.

After precipitation of the catalyst in accordance with the procedure illustrated in the foregoing examples, the catalyst is filtered hot and dried in an oven about 100° C. Thereafter, the catalyst is maintained at a temperature in the range between about 400° C. to 500° C. in a slow stream of air for at least 3 to 4 hours. Depending upon the type of reactor used, that is, a static bed or a fluid bed of catalyst, the precipitated catalyst is ground to the desired size. The catalyst may be as coarse as 1 to 2 mesh (U. S. Sieve Series) and as fine as 50% through 325 mesh, although the usual range is from 35-325 mesh. Larger particle sizes are used in static bed reactors whereas the fluid bed reactors require smaller particle sizes.

The catalysts of the present invention are particularly useful for the oxidation of saturated aliphatic hydrocarbons to oxidation end products, particularly maleic anhydride. As discussed in applicant's copending application Ser. No. 148,269, filed of even date herewith, which application is a continuation-in-part of U. S. Ser. No. 78,669, filed February 26, 1949, the present catalysts are outstanding in their ability to selectively oxidize butane to maleic anhydride. This is a particular advantage in that butane is a low cost raw material. Other organic compounds are equally readily oxidized to useful end products. Included among such organic compounds are the olefins such as the butylenes, the diolefines such as the butadienes, aromatic hydrocarbons such as benzene and naphthalene, alcohols such as methanol, various aldehydes, etc. Olefins such as the butylenes and aromatic hydrocarbons such as benzene can be readily oxidized to maleic anhydride using the present catalysts. Naphthalene is readily oxidized to phthalic anhydride, and methane or methanol may be oxidized to formaldehyde. On the other hand, besides being useful in oxidation processes, the present catalysts may also be applicable in various hydrogenation, dehydrogenation, hydroforming and dehydrosulfurization processes.

As many apparently widely different embodiments of this invention may be made without departing from the spirit and scope thereof, it is to be understood that the invention is not limited to the specific embodiments thereof except as defined in the appended claims.

I claim:

1. A precipitated oxide catalyst for the oxidation of organic compounds in the vapor phase consisting essentially of molybdenum oxide combined with a basic metal oxide from the group consisting of oxides from cobalt and nickel, together with an acidic promoter, said promoter being an oxide of an element of the class consisting of boron, phosphorus, and vanadium, the proportion of acidic promoter calculated on the weight of the said element being 0.1% to 15% of the weight of the said catalyst, the basic metal oxide component of the catalyst being the precipitate formed by precipitation of the said basic metal as molybdate from an aqueous medium containing an amount of molybdenum in the form of molybdate stoichiometrically in excess of the amount of the said basic metal, the atomic ratio of the basic metal to molybdenum in the precipitated catalyst being from .90:1 to .62:1.

2. A precipitated oxide catalyst as set forth in claim 1 wherein the basic metal oxide is cobalt oxide.

MARTVAL JOHN PAUL HARTIG.

REFERENCES CITED

The following references are of record in the file of this patent:

UNITED STATES PATENTS

| Number | Name | Date |
| --- | --- | --- |
| 2,393,288 | Byrns | Jan. 22, 1946 |
| 2,460,975 | Carosella | Feb. 8, 1949 |
| 2,486,361 | Nahin et al. | Oct. 25, 1949 |
| 2,547,380 | Fleck et al. | Apr. 3, 1951 |